(12) United States Patent
Kozlowski (10) Patent No.: US 7,616,243 B2
(45) Date of Patent: Nov. 10, 2009

(54) METHOD AND APPARATUS FOR IMPROVING AND CONTROLLING DYNAMIC RANGE IN AN IMAGE SENSOR

(75) Inventor: Lester J. Kozlowski, Simi Valley, CA (US)

(73) Assignee: AltaSens, Inc., Westlake Village, CA (US)

( * ) Notice: Subject to any disclaimer, the term of this patent is extended or adjusted under 35 U.S.C. 154(b) by 411 days.

(21) Appl. No.: 11/715,577

(22) Filed: Mar. 7, 2007

(65) Prior Publication Data

US 2008/0218602 A1 Sep. 11, 2008

(51) Int. Cl.
*H04N 3/14* (2006.01)
*H04N 5/335* (2006.01)

(52) U.S. Cl. .................................... 348/302; 348/221.1

(58) Field of Classification Search .............. 348/221.1, 348/222.1, 229.1, 302, 308
See application file for complete search history.

(56) References Cited

U.S. PATENT DOCUMENTS

| | | | |
|---|---|---|---|
| 5,461,425 A | 10/1995 | Fowler et al. | |
| 5,892,240 A | 4/1999 | Bae et al. | |
| 5,892,541 A * | 4/1999 | Merrill | 348/302 |
| 6,078,037 A | 6/2000 | Booth et al. | |
| 6,115,065 A | 9/2000 | Yadid-Pecht et al. | |
| 6,456,326 B2 | 9/2002 | Fossum et al. | |
| 6,493,030 B1 | 12/2002 | Kozlowski et al. | |
| 6,504,141 B1 | 1/2003 | Kozlowski et al. | |
| 6,535,247 B1 | 4/2003 | Kozlowski et al. | |
| 6,757,019 B1 | 6/2004 | Hsieh et al. | |
| 6,924,841 B2 | 8/2005 | Jones | |
| 6,963,370 B2 | 11/2005 | DiCarlo et al. | |
| 7,046,284 B2 | 5/2006 | Kozlowski et al. | |
| 7,091,531 B2 | 8/2006 | Boemler | |
| 7,119,317 B2 * | 10/2006 | Ando et al. | 250/208.1 |
| 7,141,841 B2 | 11/2006 | Mouli | |
| 2002/0110376 A1 | 8/2002 | MacLean et al. | |

OTHER PUBLICATIONS

"Characterization of Charge-Coupled Device Line And Area-Array Imaging at Low Light Levels" M.H. White, D.R. Lampe, I.A. Mack and F.C. Blaha, 1973 IEEE International Solid-State Circuits Conference, pp. 134, 135, 208 and 209.
"PASIC. A Smart Sensor for Computer Vision" Keping Chen, Anders Astrom and Per-Erik Danielsson, 1990 IEEE, pp. 286-291.
Copy of International Search Report.

* cited by examiner

*Primary Examiner*—Tuan V Ho
*Assistant Examiner*—Gevell Selby
(74) *Attorney, Agent, or Firm*—Reed Smith LLP (57) ABSTRACT

A method and apparatus for an electronic image sensor having a base exposure, followed by a second or multiple exposures that are formed during signal readout. A timing controller controls the signal readout, such that as each line is read, the second and subsequent exposures are subsequently added to the base exposure to enrich the dynamic range. The image sensor may further include an analog-to-digital converter and noise suppression to further enhance the efficacy of the dynamic range enrichment. The system may also include additional signal processing and scaling functions.

27 Claims, 10 Drawing Sheets

FIG. 1

PRIOR ART

METHOD AND APPARATUS FOR IMPROVING AND CONTROLLING DYNAMIC RANGE IN AN IMAGE SENSOR

BACKGROUND OF THE INVENTION

1. Field of the Invention

The present invention relates generally to imaging sensors, and more particularly to an imaging system-on-chip solution for enhancing and controlling dynamic range, while maintaining high sensor performance.

2. Description of the Related Art

Visible imaging systems implemented using CMOS imaging sensors significantly reduce camera cost and power while improving resolution and reducing noise. The latest cameras use CMOS imaging System-on-Chip (iSoC) sensors that efficiently marry highly competitive image sensing with ancillary components including timing controller, clock drivers, reference voltages, A/D conversion and key signal processing elements. High-performance video cameras can hence be constructed using a single CMOS integrated circuit supported by only a lens and battery. These improvements translate into smaller camera size, longer battery life, and applicability to new cameras that simultaneously support still capture and high definition video.

The advantages offered by system-on-chip integration in CMOS visible imagers for emerging camera products have spurred considerable effort to further improve active-pixel sensor (APS) devices. Active-pixel sensors with on-chip analog and/or digital signal processing can provide temporal noise comparable or superior to scientific-grade video systems that use CCD sensors. Complicated CMOS active-pixel circuits, on the other hand, usually have higher fixed pattern noise (possibly requiring additional iSoC or camera circuitry to suppress the noise), lower quantum efficiency, and limited image sensor scalability to higher resolution using smaller pixel pitch.

Figure 1:
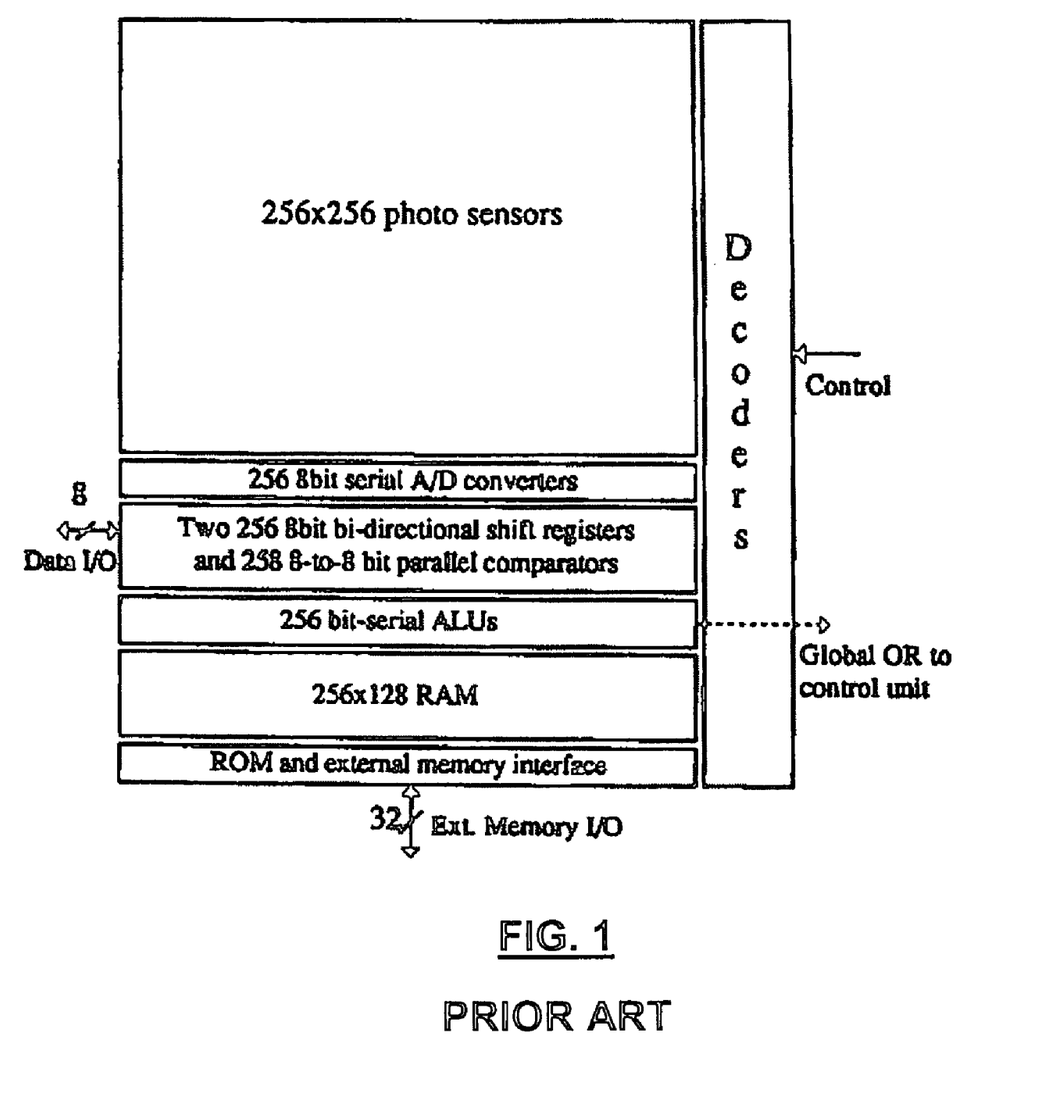
FIG. 1 is a block diagram of a prior art circuit as disclosed by Chen in Proceedings of 10th International Conference on Pattern Recognition (1970)
Figure 2:
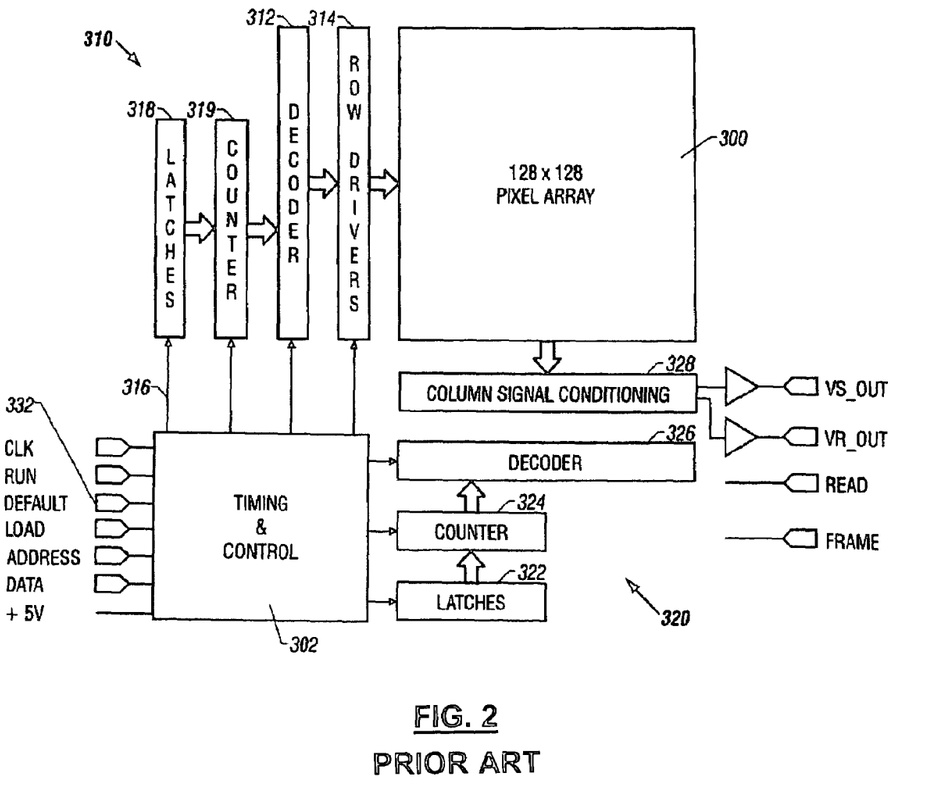
FIG. 2 is a block diagram of a prior art circuit taught by Fossum in U.S. Pat. No. 6,456,326.
Figure 3:
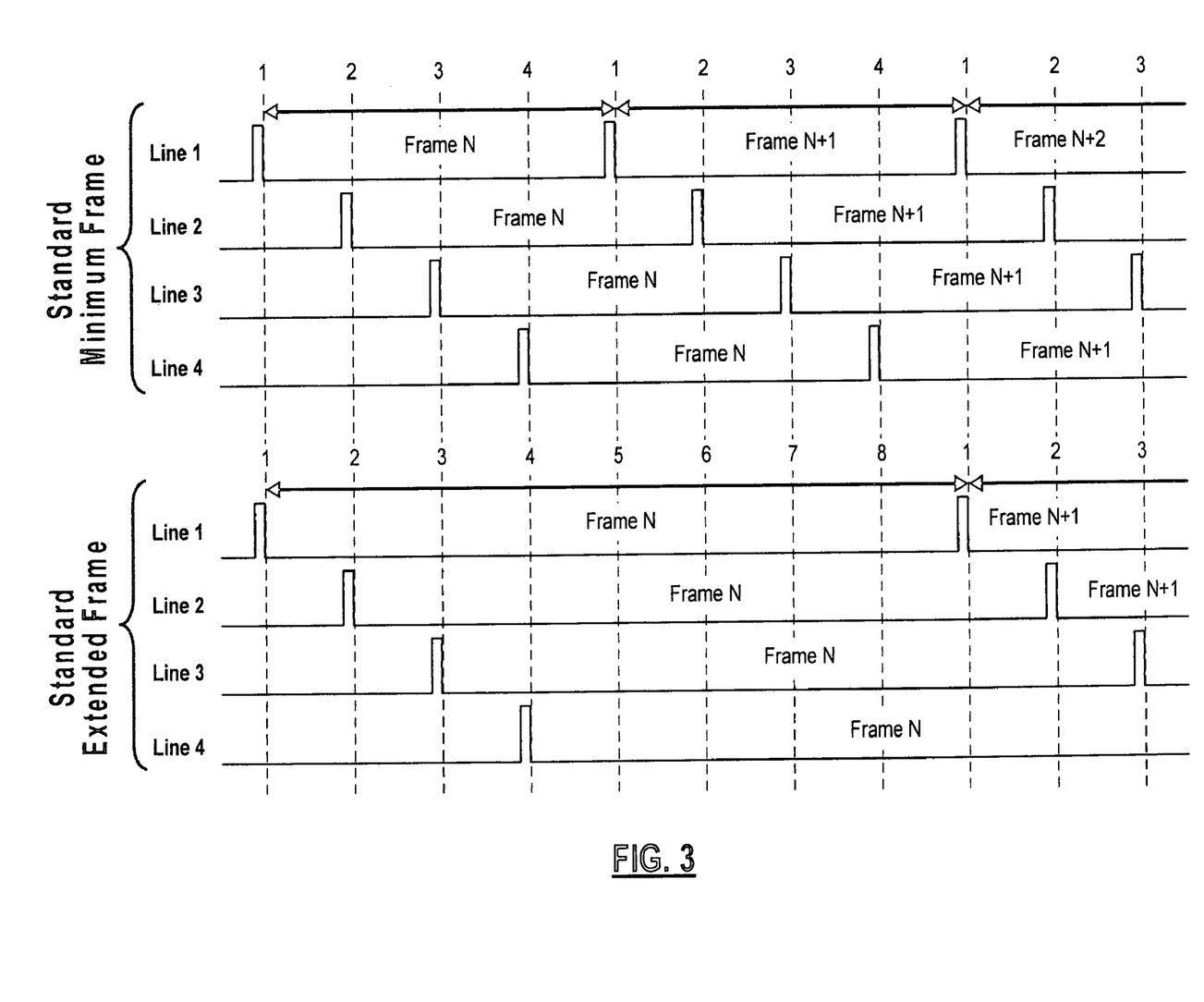
FIG. 3 is a representative timing diagram illustrating line synchronization timing for the prior art circuit of U.S. Pat. No. 6,456,326.

FIG. 1 is a block diagram for a representative CMOS imaging SoC of the prior art described by Chen (Proceedings of 10th International Conference on Pattern Recognition, 16-21 Jun. 1990, vol. 2, page(s): 286-291). While Chen teaches iSoC integration including A/D converter per column and signal processing with supporting memory, dynamic range is limited by the signal chain from the pixel through the A/D converter. U.S. Pat. No. 6,456,326 (FIG. 2) subsequently included the correlated doubling sampling taught by White (1973 International Solid State Circuits Conference, pp. 134-135, 208-209) to reduce reset kTC noise and improve instantaneous dynamic range. Pixel Array 300 in the '326 patent is further supported by timing controller 302 in conjunction with horizontal logic 320 and vertical logic 310 to generate electronic images at the READ node. Those skilled in the art will appreciate that FIG. 3 is a representative timing diagram for such imaging sensors including Chen and the '326 patent although, for simplicity, we assume an imaging sensor having four rows.

Each frame's image is formed on a line-by-line/row-by-row basis so that the imaging sensor has a so-called "rolling shutter." In other words, there is a built-in latency of one line time between each row of the sensor since reading and resetting of each row is handled line-by-line. Over the course of each frame time for the full frame integration outlined in FIG. 2, the top line actually finishes integrating just as the bottom line begins integrating that frame's image. Maximizing the period during which the entire array is actively integrating hence requires the standard extended frame timing shown in FIG. 3. Concern over the latency and the general trend for greatly increasing sensor noise, with even modest increases in data rate, has prevented other designs from leveraging the line-by-line nature of imaging sensor readout to actually boost performance.

U.S. Pat. No. 7,046,284 discloses a modern high-performance low-noise CMOS imaging system comprising a low noise pixel array supported by high-performance column buffers and high-speed, low-power A/D conversion co-located in the sensor such that the effective transmission path between the final high-speed analog video driver (column buffer, line driver or programmable gain amplifier) and the A/D converter acts as a resistor, rather than a reactance. The high-performance column buffer design, such as disclosed in U.S. Pat. No. 5,892,540 and herein incorporated by reference, minimizes column-based fixed pattern noise while competently handling the signal from each pixel on a column-by-column basis. The read out circuit for each column of pixels includes a high gain, wide bandwidth, CMOS differential amplifier, a reset switch and selectable feedback capacitors, selectable load capacitors, correlated double sampling and sample-and-hold circuits, optional pipelining circuit to simultaneously process multiple rows, and an offset cancellation circuit connected to an output bus to suppress the input offset non-uniformity of the wideband amplifier supplying the signal to the high-speed A/D converter. The system may further include both an analog gain amplifier stage and a digital programmable amplifier stage. While the resulting imaging System-on-Chip generates still images or video with at least 12-bit resolution, even wider dynamic range is desired to surpass the exposure latitude of photographic film. This requirement mandates further evolution in the CMOS iSoC architecture to deliver more bits per image frame without requiring support from the camera's signal processor.

Several schemes exist in the prior art for enhancing dynamic range using alternative pixel implementations incorporating in-pixel digitization, noise filtering, multiple storage sites, self-reset, variable capacitance and gamma modification, among others. Representative disclosures for these inventions respectively include U.S. Pat. Nos. 5,461,425; 6,504,141; 6,078,037; 6,963,370; 7,091,531, and 7,141,841. Unfortunately, higher circuit complexity in the pixel often increases fixed pattern noise thereby negating any effective boost in capacity. The prior art also teaches systemic solutions requiring camera processing to broaden dynamic range. These typically rely on processing multiple images at two or more exposure times; hence, they add significant cost to the camera bill of materials (BOM) via additional memory, memory controllers and advanced signal processing.

SUMMARY OF THE INVENTION

A method and apparatus for an electronic image sensor having a base exposure, followed by a second or multiple exposures that are formed during signal readout, before a next row is read. A timing controller controls the signal readout, such that as each line is read, the second and subsequent exposures are subsequently added to the base exposure to enrich the dynamic range. The image sensor may further include an analog-to-digital converter and noise suppression to further enhance the efficacy of the dynamic range enrichment. The system may also include additional signal processing and scaling functions.

In one embodiment, a method for enhancing the dynamic range of an electronic image sensor, the image sensor having rows of pixels, comprises processing a pixel signal over a first integration period to form a first signal sample for each pixel in a current row; reading the first signal sample for each pixel in the current row, on a row-by row basis; storing the first signal samples from the current row of the imaging sensor in a memory; processing the pixel signal for each pixel in the current row over a second integration period, prior to reading the first signal samples of a next row, to form a second signal sample of each pixel in the current row; and combining the first and second signal sample for each pixel of the first row to produce an enhanced signal, thereby enhancing the dynamic range of the image sensor.

In on embodiment, the second period is shorter in duration than the first period. The method may be performed by modifying a standard readout timing signal to include two readout signals for each row of the image sensor. In operation, the method is preferably performed such that it is transparent to other circuit blocks in the image sensor.

In an alternate embodiment, three or more signal samples for each pixel are read out from each row.

Several exemplary algorithms are described herein which may be used to combine the signals. For example, the step of combining may comprise scaling the first and second signal samples according to a ratio of the respective integration periods, and then adding the scaled samples. The step of combining may comprise scaling the second signal sample by a product of the ratio of the integration periods and a measured correction factor, and then adding the scaled signal to the first signal sample. The step of combining may comprise scaling the second signal sample by a weighted ratio of the integration periods, and then adding the scaled signal to the first signal sample.

Additionally, the step of combining may comprise filtering the signal samples using a sin(x)/x function, and then scaling and adding the samples. The step of combining may comprise filtering the signal samples using a finite impulse response function, and then scaling and adding the samples.

For operation with an image sensor utilizing a global shutter, the first signal sample is formed for each pixel in the sensor during a main exposure using a global shutter, and then each pixel in each row is enhanced by forming the second signal sample during signal readout of each row.

For video processing applications, the first signal sample is processed during a period from a first region of a video transfer characteristic, and the second signal sample is processed from a post-knee region for brightly illuminated pixels.

In one embodiment, an analog-to-digital converter in a signal path of the image sensor is adjusted during the second period to more finely digitize a smaller portion of the pixel signal during the second period, and then adds the finely digitized signal sample to the first signal sample.

The present invention includes an image sensor apparatus. In one embodiment, an electronic image sensor comprises a plurality of pixels arranged in a plurality of rows; a timing controller to control the readout of signals from each pixel on a row-by-row basis; a dynamic range enhancement circuit that receives the signals read out from each row of pixels; and a dynamic range enhancement memory circuit connected to the dynamic range enhancement circuit; wherein the timing controller controls the read out of a first signal and a second signal from each pixel in a current row, the first and second signals read out before reading out signals from a next row; wherein the dynamic range enhancement memory stores the first signal for each pixel in a row, while the second signal is being read out from the row; and wherein the dynamic range enhancement circuit combines the first and second signals.

The duration of the second signal may be shorter than the duration of the first signal. The image sensor may further comprise an analog-to-digital converter in a signal path of the image sensor, wherein the analog-to-digital converter is adjusted during readout of the second signal to more finely digitize a smaller portion of the second signal.

The present invention may be utilized with an image sensor utilizing a global shutter, wherein the first signal is formed for each pixel in the sensor during a main exposure using a global shutter, and then each pixel in each row is enhanced by forming the second signal during signal readout of each row.

In operation with video processing applications, the first signal is processed during a period from a first region of a video transfer characteristic, and the second signal is processed from a post-knee region for brightly illuminated pixels.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

In general, the present invention is a self-contained CMOS imaging System-on-Chip whose dynamic range actively extends beyond the typical practical limit for imaging sensors set by the ratio of the maximum instantaneous linear signal swing (supported by the end-to-end signal path) to the minimum aggregate sensor noise (quadrature sum of all noise sources: pixel+analog signal chain+digitizer). Depending on exposure setup, dynamic range is enriched from the standard value by up to a maximum of $20 \times \log(2^N)$ dB where N is the number of A/D converter bits. In practice, the dynamic range enrichment of the present invention is typically targeted for 24 dB so that a nominal dynamic range of 12 bits is extended to 16 bits by effectively increasing signal-handling capacity and reducing noise.

The present invention is generally applicable to many new imaging SoC products as its general requirements include low-noise sensor-based amplification, on-chip digitization and capability for signal processing. Maximum benefit is achieved by low-noise on-chip digitization wherein the sensor's aggregate noise is dominated by pixel noise, is largely independent of video rate, and is hence superior to competing CCD imaging sensors. The invention takes full advantage of the faster throughput provided by CMOS iSoCs. Digitizing the multiplexed signal from the column buffers with one or relatively few high-speed A/D converters in close proximity to the final video buffer insures that the iSoC sensor's performance is limited only by the temporal noise floor of the CMOS pixel. While the instantaneous dynamic range is the ratio of the maximum signal swing at the input of the A/D converter to the total noise including inaccuracy in analog-to-digital conversion, the total dynamic range after dynamic range enrichment is limited primarily by the precision of the on-chip mixed-signal processing that extracts the additional bits of dynamic range.

A preferred embodiment of the present invention includes automatic pattern noise suppression to maximize the analog dynamic range prior to A/D conversion and thereby maximize the efficacy of dynamic range enrichment. A timing supervisor is also used to optimally control imaging operations including successive reading and resetting of each line of video. The timing supervisor controls dynamic range enrichment by enabling each line of pixels to seamlessly support at least a second exposure and reset interval that is nominally one line in duration. Finally, the system includes embedded signal processing to digitally combine the initial N-bit sample formed over the standard integration epoch with a second sample of up to N bits that is formed during a brief second exposure. The combined data enrich the dynamic range beyond the usual N-bit level normally available. Additional dynamic range exposure (DRE) exposures can also be performed to further enrich the dynamic range.

While the present invention leverages the intrinsic nature of CMOS sensors to form the electronic image using a rolling shutter rather than an instantaneous snapshot, it is also compatible with CMOS sensors supporting global shutter operation. In this case the primary snapshot exposure is performed just as before, but additional exposure information is gathered on a row-by-row basis so that the final image is an amalgamation of the primary snapshot exposure and secondary rolling shutter exposures. Exposure control is hence controlled on both global and line-by-line basis.

Thus, the present invention provides a robust dynamic technique for generating additional information in the bright regions of an electronically reproduced image by using a second exposure whose operation is effectively transparent to the camera electronics and is composed within the SoC imaging sensor. In standard operation, the second exposure interval is preferably on the order of $\frac{1}{1000}^{th}$ of the main exposure's duration to smoothly provide additional information in the bright area of each image and take advantage of the fact that the bright parts of an image are dominated by photon shot noise rather than sensor noise. When set to the order of $\frac{1}{1000}^{th}$ of the main exposure interval, the $2^{nd}$ exposure effectively adds information starting at the $10^{th}$ bit, i.e., 1024 LSBs. Using longer exposures or alternative signal processing algorithms, however, the second exposure can also be used to reduce noise in the lower bits. Furthermore, the preferred embodiment supports analog and digital signal processing in the iSoC to suppress imaging sensor noise using digital correction terms that are applied in the analog domain to fully maximize the sensor's dynamic range prior to digitization so that the present invention truly delivers extremely wide dynamic range. Finally, since each of the two samples are supplied from identical pixels having high optical fill factor, identical signal chain, and no extraneous components, extremely high performance is maintained without compromise; no elaborate in-camera processing is required as the sensor supplies the full dynamic range in contiguous bytes on a frame-by-frame basis.

The present invention has the advantage of full process compatibility with standard salicided (self-aligned silicide) submicron CMOS. Circuit complexity is added to the digital logic rather than to the active-pixels or peripheral analog circuits, thereby exploiting the SoC signal-processing capability inherent to CMOS. Those skilled in the art appreciate that although the present invention targets spectral response in the visible band, which nominally encompasses the near-ultraviolet (400 nm) to the near-IR (>950 nm), the scheme is useful in other sensors that use CMOS readout integrated circuits (ROICs), including hybrid focal plane arrays. Dynamic range enrichment that doesn't increase camera complexity and power consumption is useful in most cameras.

Because the low-noise imaging System-on-Chip can use as few as three MOSFETs in each pixel (3T pixel), the present invention can offer as-drawn optical fill factor >50% at 5 µm pixel pitch using inexpensive 0.25 µm CMOS process technology. Other methods for enhancing dynamic range via pixel modifications often degrade fill factor and thereby signal-to-noise ratio. Optical fill factor for the present invention is also above 40% at 4.25 µm pixel pitch using alternative four transistor (4T) pixels with pinned photodiodes in 0.18 µm CMOS technology since the basic pixel design can remain unchanged while still boosting dynamic range. Those skilled in the art will also appreciate that fixed pattern noise does not increase relative to baseline values achieved for high-performance pixels optimized for high sensitivity and optical fill factor by not touching the pixel design. Summarily then, by using optimized pixel designs in imaging SoC architectures employing high-speed, low-noise on-chip A/D conversion, the present invention supports: 1) temporal read noise $\leq$3 e- with 3T or 4T pixels at data rates fully compatible with either high definition television video or still photography via electronic means; 2) fixed pattern noise significantly below 1 LSB of the maximum signal; 3) <0.5% non-linearity; 4) $\geq$1.5 V signal swing at 3.3 V power supply; 5) similarly large linear charge-handling capacity; 6) variable sensitivity using simple serial interface updated on a frame-by-frame basis via digital interface to a host processor; and 7) dynamic range extending beyond the nominal range provided by the standard A/D conversion.

When alternatively using 5T pixel designs to support, for example, global shutter operation for snapshot image formation over the entire sensor, the present invention still enriches dynamic range and thereby enables reduction in snapshot pixel pitch relative to the state of the art while simultaneously enriching dynamic range. Leveraging the iSoC apparatus taught by U.S. Pat. Nos. 6,965,707 and 0.18 µm CMOS design rules, 5T pixel pitch is reduced to $\leq 5$ microns while maintaining random noise comparable to competing 3T and 4T pixels, and achieving $\geq 12$ bit dynamic range. Competing 5T sensors not benefiting from the present invention, by way of comparison, use larger pixel pitch to produce up to 8 bits of useful imaging data per pixel.

A prototype embodiment of the low-noise APS invention forms a visible imager comprising an array of 1920 (columns) by 1080 (rows) of visible light detectors (photodetectors). The rows and columns of pixels are spaced 5 microns center-to-center to support the standard ⅔-inch optical format used for broadcast and professional cameras to generate standard or high definition video with excellent depth of field. While 3T designs support the requisite dynamic range to meet minimum specifications, dark current minimization is problematic so alternative 4T design with pinned diode may be preferred. On the other hand, conventional designs using 4T pixels can not normally support the wide dynamic range needed for film-like exposure latitude. The dynamic range enrichment of the present invention boosts conventional 4T dynamic range from about "250%" to well beyond "600%" (where 100% corresponds to the standard signal generated when viewing a gray patch having 89.9% reflectivity under illumination of 2000 lux at f8 aperture). In other words, the present invention enriches dynamic range with 4T pixels at 5 micron pitch to significantly beyond 12 bits. Several columns and rows of detectors at the perimeter of the light-sensitive region are covered with metal to establish the dark level for off-chip signal processing. In addition, the detectors in each row are covered with color filters to produce color imagers. For example, the odd rows may begin at the left with red, green, then blue filters, and the even rows may begin with blue, red, then green filters, with these patterns repeating to fill the respective rows.

Figure 4:
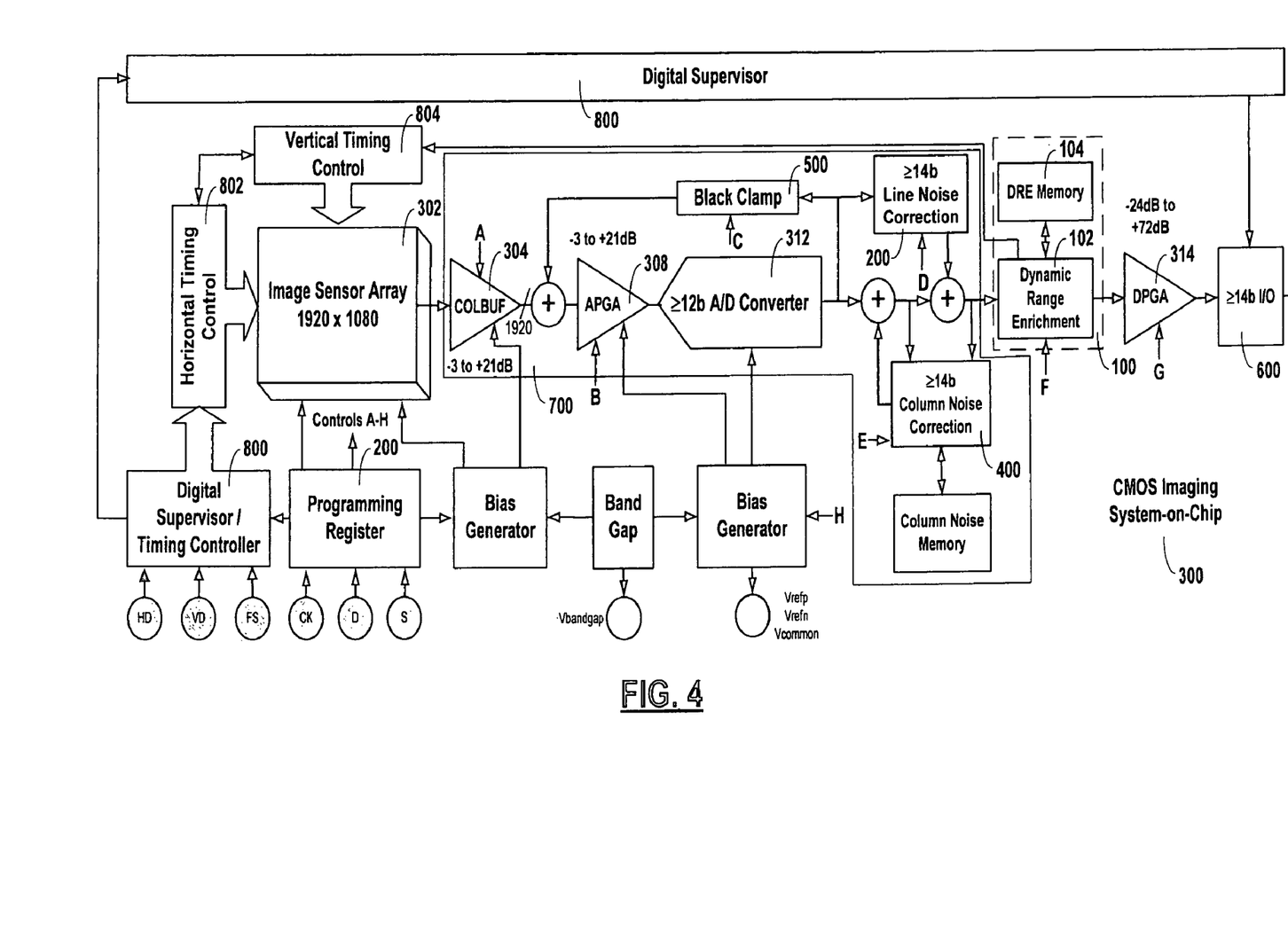
FIG. 4 is a block diagram of the present invention.

A block diagram of a system incorporating the present invention is shown in FIG. 4. The imaging system-on-chip 300 consists of image sensor pixel array 302 whose noise should dominate in the iSoC and is therefore minimized by applying tapered reset for 3T and 5T pixel implementations to suppress kTC noise or by alternately using 4T pixels. In case of tapered reset implementations, the necessary supporting circuitry is included in Column Buffer 304 and Horizontal Timing Control 802 as disclosed in U.S. Pat. No. 6,493,030 and U.S. Pat. No. 6,535,247, the disclosures of which are herein incorporated by reference. Regardless of the specific pixel implementation, column buffer 304 reads the pixel signal, double samples to remove fixed pattern noise, amplifies depending on scene illumination to simultaneously minimize noise and maximize signal swing, and suppresses electrical offsets that are otherwise generated in each Column Buffer 304, on a column-by-column basis.

The conditioned analog data are supplied to Stabilization Block 700, which maximizes analog dynamic range prior to digitization by subtracting offsets in the analog domain via digital feedback, digitizes the analog data stream, suppresses column and line noise, and stabilizes the signal by clamping the black level. Within Stabilization Block 700, Programmable Gain Amplifier 308 incrementally subtracts offsets from the analog stream on a pixel-by-pixel basis, provides final amplification if needed, and optionally limits the electronic bandwidth prior to digitization, which is performed by A/D converter 312. Analog dynamic range is maximized prior to digitization by black clamping and subtracting both column and line offsets on a pixel-by-pixel basis. High-speed A/D converter 312, which is located in close proximity to the output of PGA 308, digitizes the analog data stream to at least 12 bits of resolution to support at least 4096 least significant bits (LSBs) of image content per pixel. The analog-to-digital conversion is preferably via a pipeline architecture comprising multiple pipeline stages to enable programmable digitizing resolution by selecting the number of resolving stages. The digitized data stream, which includes both optical black (OB) and photo-generated pixel data, is hence conditioned within Stabilization Block 700 by a black clamping operation in Black Clamp 500, line noise correction in Line Noise Corrector 200, and column noise correction in Column Noise Corrector 400. Stabilizer Block 700 is a mixed-signal System-on-Chip solution comprising both analog and digital circuits to minimize residual noise in the analog domain prior to dynamic range enrichment. The stabilization operations of Stabilization Block 700, along with preferred implementations, are further disclosed in U.S. patent application Ser. No. TBD, entitled APPARATUS AND METHOD FOR STABILIZING IMAGE SENSOR BLACK LEVEL, the disclosure of which is herein incorporated by reference.

Stabilization block 700 supplies the digital signal stream to the present invention, Dynamic Range Enrichment (DRE) Block 100, which comprises digital logic in DRE sub-block 102 and supporting DRE memory 104 to optimally add two samples that are acquired via the sensor timing circuit of the present invention. DRE block 100 subsequently forwards the enhanced video stream to a digital programmable gain stage 314, such as taught by U.S. patent application Ser. No. 10/460,014, entitled DIGITAL PROGRAMMABLE GAIN STAGE WITH HIGH RESOLUTION FOR CMOS IMAGE SENSORS, filed Jun. 11, 2003, the disclosure of which is herein incorporated by reference, and may be used to adjust the gain of the final output. The digital data stream is output from the sensor via I/O Port 600.

Dynamic range is enriched in block 100 using two consecutive samples for each line of pixels wherein each line is generated at integration times that are, in the typical imaging sensor, disparate by factors of tens to hundreds to thousands. It is preferable, however, that the ratio of integrations should be divisible by a power of 2. Owing to the on-chip integration and exploiting the built-in property of line-by-line readout in the CMOS iSoC to consecutively provide the two samples on successive image processing cycles, the enrichment is transparent to the camera except for the end result.

Figure 5:
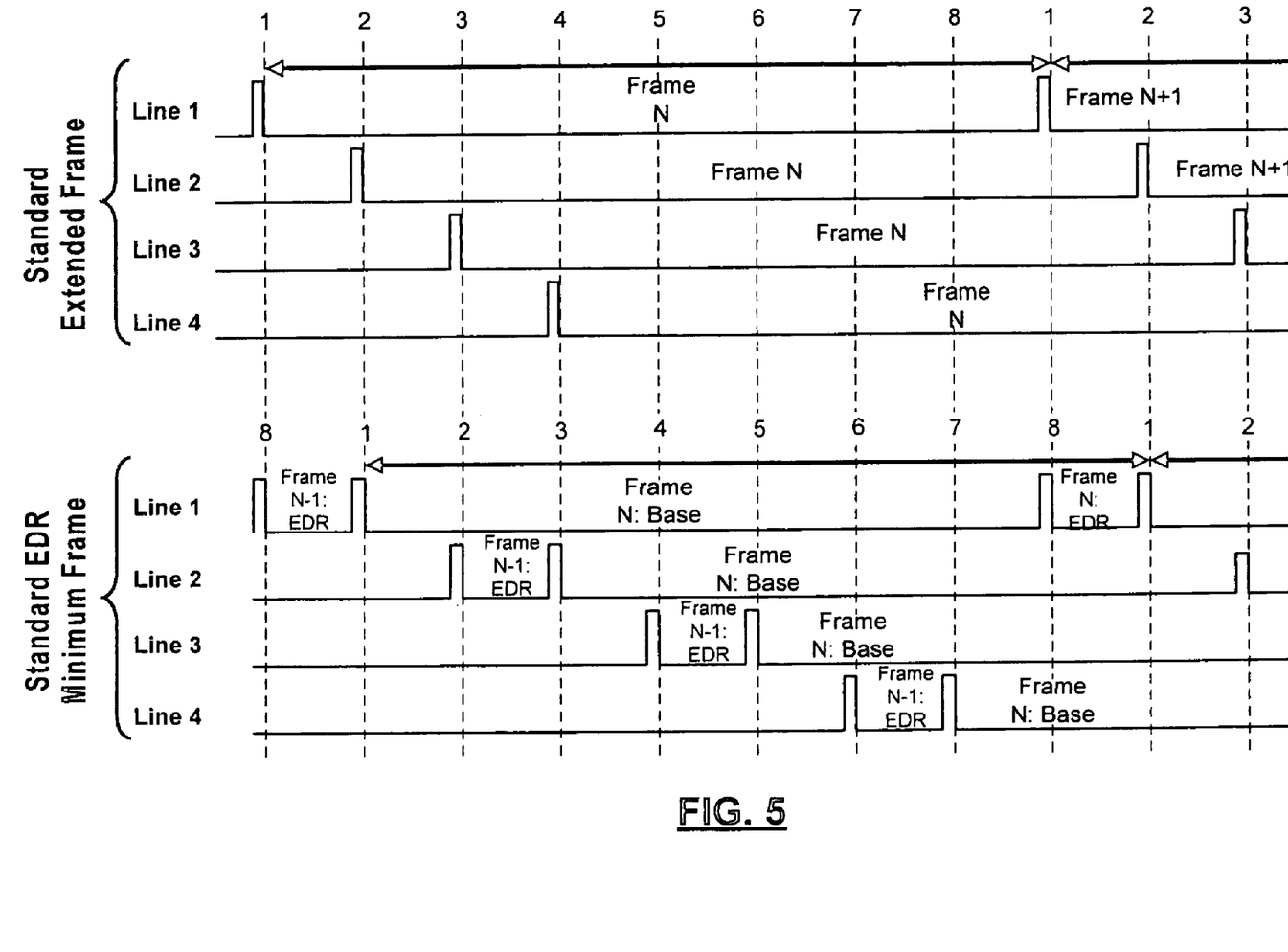
FIG. 5 is a timing diagram of the present invention illustrating line synchronization timing.

FIG. 5 is a timing diagram showing the line synchronization pulses for 4 lines of video in a simplified sensor comprising only 4 rows, i.e. an X column by 4 row imaging sensor. The top half of the diagram illustrates a standard extended frame period comprising 8 line times to support a contiguous interval of at least 4 line times during which the entire sensor is photo-optically active. However, such an interval is not required; short primary exposures are supported by the present invention but the dynamic range enrichment in such cases is more of a noise reduction process rather than wholesale enhancement in charge-handling capacity. Shorter integration times of fewer line-time multiples and even sub-single line time can be conveniently arranged in most imaging sensors.

In the bottom half of FIG. 5, alternative timing is set up to support dynamic range enrichment in the present invention. In the integration and readout of Line 1, for example, the base 12-bit image is formed during the line times from the 1$^{st}$ falling edge of clock Line 1, Frame N, through the 8$^{th}$ falling edge of clock Line 1, Frame N: EDR. Dynamic range is enriched for the pixels in line #1 by subsequently integrating a second 12-bit image during the line times between the 8$^{th}$ falling edge of Line 1 through the next falling edge #1 of the Line 1 clock. In comparing the bottom half of FIG. 5 to the top half, dynamic range enrichment is hence enabled by reducing the base integration period by one line time. Also, the minimum sensor frame time is doubled relative to a conventional sensor. For a conventional imaging sensor having X columns by Y rows, the dynamic range enrichment of the present invention hence requires doubling the minimum frame time. While the minimum frame time for an X by Y sensor is typically Y line times, the minimum frame time for a DRE-enabled sensor is 2Y line times. Re-establishing a nominal frame time under the present invention thus requires halving the standard line time to compensate.

Figure 6:
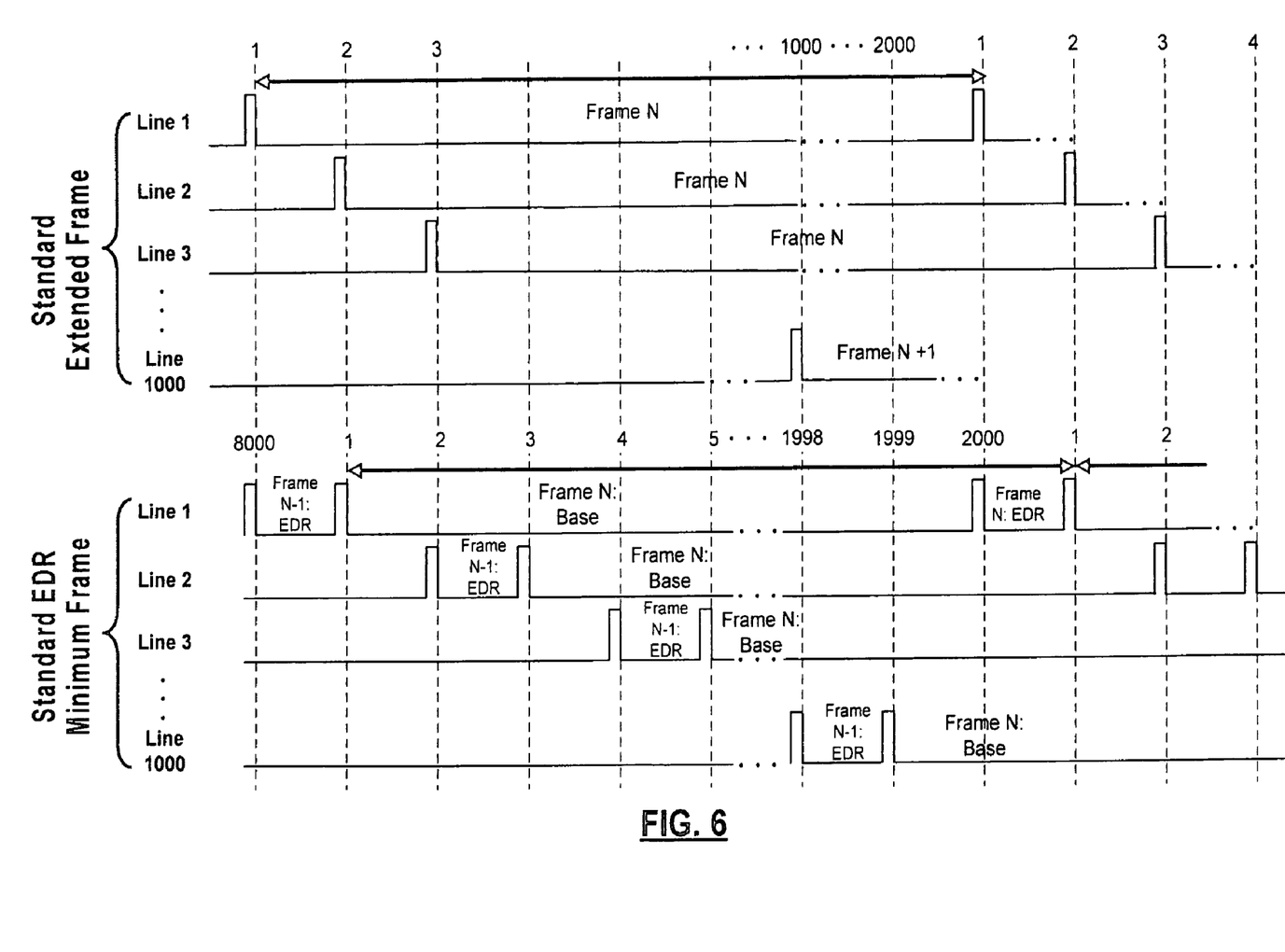
FIG. 6 is a timing diagram of the present invention illustrating line synchronization and dynamic range enrichment timing.

The timing diagram shown in FIG. 6 extends the sensor to 1000 rows by Y columns. Once again the top-half diagram shows the timing for a standard extended frame wherein the total integration time is 1999 line times and the overlap interval wherein all rows are simultaneously integrating is 1000 line times. The bottom-half diagram shows the corresponding DRE timing for a sensor embodiment employing rolling shutter. The base 12 bits for Line 1 are produced by integrating Line 1 starting at falling edge #1 through falling edge #2000. The additional DRE bits for Line 1 are produced starting at falling edge #2000 through the next falling edge #1 for frame N. Similarly, the base 12 bits for Frame N of Line 1000 are produced by integrating Line 1000 beginning at falling edge #1999 through falling edge #1998 of Frame N+1 (i.e., 1999 line time of integration). The DRE bits for Line 1000 are produced starting at falling edge #1998 of Frame N+1 through the falling edge #1999 for frame N (i.e., DRE integration time of 1 line time).

The dynamic range enhancement of the present invention is facilitated in the iSoC by: 1) processing the 1$^{st}$ sample in DRE sub-block 102, 2) storing the processed 12-bit data in DRE memory 104 while concurrently processing the second sample in DRE sub-block 102; and 3) accessing the base 12-bit data from memory sub-block 104 and merging with the additional DRE data in DRE 102. Those skilled in the art appreciate that multiple additional samples can alternatively be supported by accruing additional EDR data. Additional exposures require reduction in line time in order to maintain constant frame time. Additionally, the two or more sets of N-bit data can alternatively be sent off the sensor and externally processed if desired. Furthermore, various well-known digital filtering can be applied to the data using finite impulse response implementations and other means.

Figure 7A:
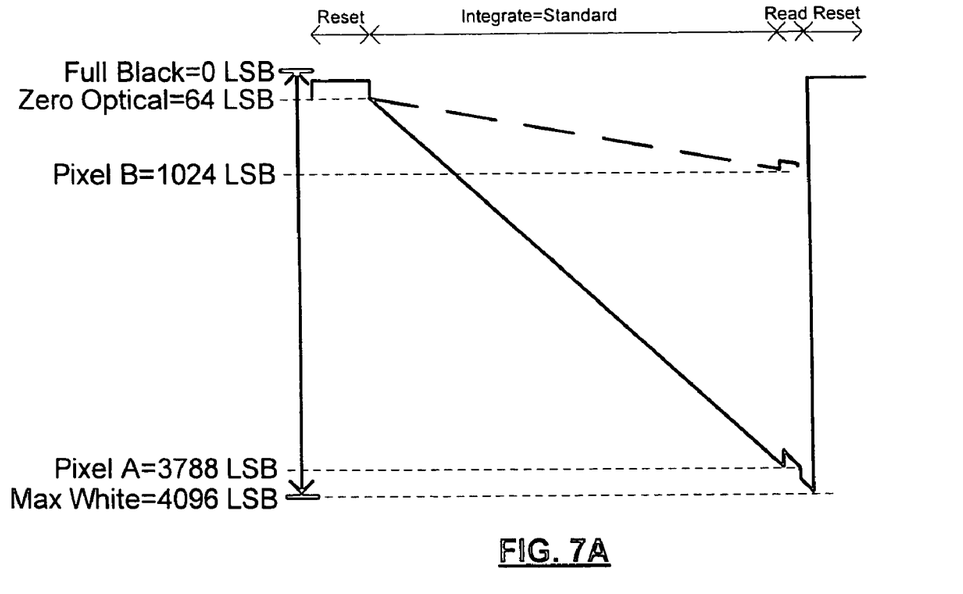
FIG. 7A is an illustration of the integration ramps for two representative pixels during primary exposure to generate the base imaging bits for 12 bit digitization where the A/D converter range is matched to the maximum pixel signal swing.
Figure 7B:
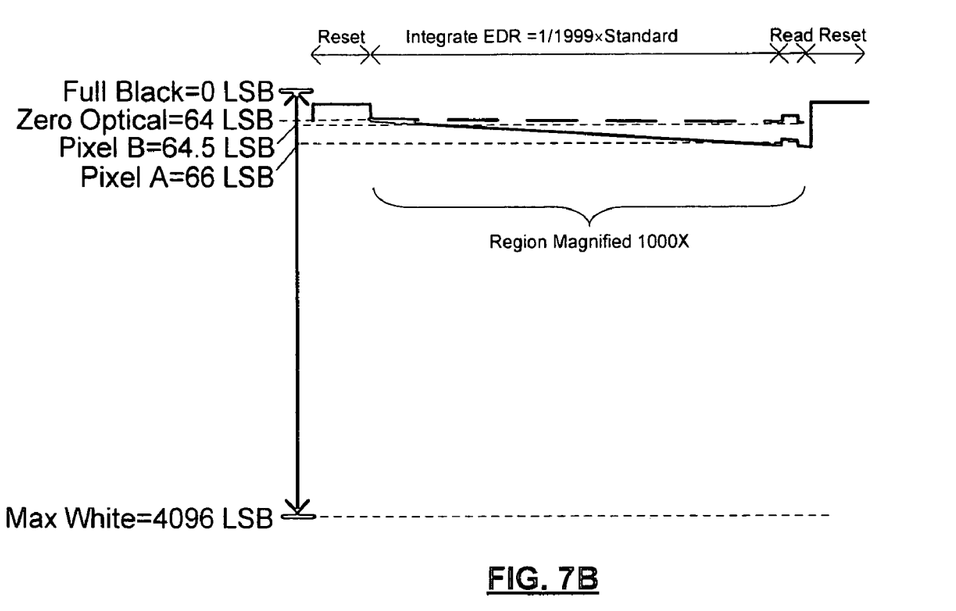
FIG. 7B is an illustration of the integration ramps for two representative pixels during a $2^{nd}$ short exposure ($1/1999^{th}$ of base exposure) to facilitate dynamic range enrichment where the A/D converter range is matched to the maximum pixel signal swing.

FIG. 7 illustrates dynamic range enrichment on a pixel level. CMOS sensors typically use buried n junctions in a p-type substrate so the photogenerated carriers discharge the photodiode relative to its initial voltage at the start of integration. In FIG. 7A, the integration ramps for two pixels are simultaneously depicted, one with strong incident light and the other with less incident light (about 25% of intensity relative to Pixel A). Also graphically depicted on the left side is the 4096 LSB range of a 12-bit A/D converter that is set up to produce a digital value of 64 LSBs for zero signal in the pixel (i.e., pixel black level) and 4096 LSBs near saturation. Setting the zero signal level above 0 LSB allows in-sensor and in-camera processing to stabilize the black level without clipping regardless of environmental variations, etc. As shown over the integration time of 1999 line times as per the timing diagram of FIG. 6, Pixel A produces a final signal value corresponding to 3788 LSBs while Pixel B produces a signal value of 1024 LSBs. Next, during a minimum DRE integration interval of one line time in FIG. 7B, the two pixels produce final values of approximately 1/1999$^{th}$ the earlier base values owing to the shortened integration time. Pixel A hence produces a final value of about 66 LSB, or only 2 LSB's above the black level of 64 LSB. Pixel B would produce a final value of 64.5 LSB, which would translate to either 64 or 65 LSB depending on sensor noise or whether the A/D resolution is rescaled.

Rather than being a problem, however, the short DRE integration interval is nearly ideal since the dynamic range enhancement is targeted for the upper LSBs, i.e., bits 10 and higher, and it is therefore critical that the integration time be sufficiently short during this interval to preclude pixel saturation in even the most strongly illuminated regions of the image sensor. This exposure coverage enables enriched information content on both the dark and bright regions of the image.

DRE block 102 subsequently processes the multiple image samples from each line of the imaging sensor using various signal processing algorithms. The most direct algorithm involves scaling the DRE information by the ratio of integration times and adding the rescaled DRE data to the base 12-bit data. For the example above, the signal content for Pixel A is rescaled from a differential signal of 2 LSBs to 3998 LSBs for a grand total of 4062 LSB (3998+black level of 64). Pixel B's DRE sample is rescaled from 64.5 LSB (if multiple samples are taken to accurately determine the average) to 1063.5 LSB. Consequently, after directly adding the two samples together, the final value of Pixel A is 3788+4062=7850 LSB and the final value of Pixel B is 1024+1063=2087 LSB. Rather than the base dynamic range of 12 bits, the maximum dynamic range achievable with the present invention is:

$$DR_{Max} = DR_{Base} + DR_{DRE}$$
$$= 2^{12} + \frac{t_{long}}{t_{short}} \times 2^{12} \leq 2^{12} \times (1 + SensorRows)$$
$$\approx 2^{12} \times 2^{10}, \text{ if Sensor Rows} \geq 1000$$
$$\approx 2^{22}$$

Correspondingly, the maximum dynamic range enhancement for an imaging sensor comprising at least 1000 rows is approximately 20×log($2^{10}$)=60.2 dB.

As those skilled in the art will appreciate, a key requirement for achieving effective dynamic range enhancement is to minimize the noise associated with the enrichment process. Furthermore, enhancement of 60.2 dB is only needed for special applications. Thus, one embodiment of the present invention involves rescaling the A/D converter to focus on information just beyond the base 12 bit dynamic range. This involves, for example, adjusting or reprogramming the A/D converter references to finely digitize a smaller portion of the pixel signal excursion during DRE sample digitization rather than the full range covered during base digitization at standard resolution. Relative to the example articulated earlier, digitizing only the first 1/16$^{th}$ of the pixel integration ramp with full converter resolution increases the expected DRE signals to 32 and 8 LSB, respectively, well above the expected sensor noise floor. The tradeoff is that the composite dynamic range is reduced to slightly over 18 bits:

$$DR_{Max} = DR_{Base} + DR_{DRE}$$

$$= 2^{12} + \frac{t_{long}}{t_{short}} \times 2^8$$

$$\approx 2^{12} + 2^{18}, \text{ if Sensor Rows} \geq 1000$$

$$= 2^{18.3}$$

The maximum dynamic range enhancement for the sample case wherein the converter is returned to span $\frac{1}{16}^{th}$ of the pixel signal swing to more accurately read the DRE value is reduced to $20 \times \log(2^{6.3})$, or 37.9 dB.

The objective of the preferred embodiment is to enhance dynamic range by about 24 dB, i.e., add about 4 bits beyond the base 12 bits. Assuming a sensor with at least 1000 rows the solution is to monitor about $\frac{1}{64}^{th}$ of the maximum pixel swing during the DRE measurement interval. However, increasing the number of rows to 2000 and 4000 requires ADC rescaling to handle $\frac{1}{32}^{nd}$ and $\frac{1}{16}^{th}$, respectively, of the pixel's maximum signal swing. Preferred and alternative algorithms for dynamic range extension hence include the following schemes:

1. Rescale A/D converter range during the DRE measurement interval(s) to improve the accuracy in measuring the DRE signal in trade for less dynamic range enrichment. Add the DRE signal value to the base 12-bit sample so that the sum is the composite signal value:

$$\text{Value} = Signal_{long} + \frac{t_{long}}{t_{short_1}} \times \frac{Signal_{short_1}}{ADC_{factor}},$$

where $ADC_{factor}$ is the level of noise minimization and is the reciprocal of the base digitizing range to the DRE digitizing range during the short integration time.

2. Scale DRE value(s) acquired for short integration time (s), $t_{short}$, by the corresponding ratios of integration times. Add the multiple signal values so that the sum of the samples is the composite signal value $$\text{Value} = Signal_{long} + \frac{t_{long}}{t_{short_1}} \times \frac{Signal_{short_1}}{ADC_{factor}}$$

3. Scale signal values of DRE measurements by product of ratio of integration times and a measured correction factor ($\alpha$, $\beta$, etc.,) to account for systemic errors arising from shortened integration time. The correction factor is empirically determined by measuring sensor noise in DRE sub-block 102. Add the multiple signal values so that the sum of the samples is the composite signal value:

$$\text{Value} = Signal_{long} + \alpha \frac{t_{long}}{t_{short_1}} Signal_{short_1} + \beta \frac{t_{long}}{t_{short_2}} Signal_{short_2} + \ldots$$

4. Scale DRE sample(s) by weighted ratio of integration times and add samples so that the composite value for each pixel is:

$$\text{Value} = Signal_{long} + \alpha' \frac{t_{long}}{t_{short_1}} Signal_{short_1} + \beta' \frac{t_{long}}{t_{short_2}} Signal_{short_2} + \ldots$$

Here the weighting factors $\alpha'$, $\beta'$, etc., compensate for systemic noise determined by signal processing within the sensor acting on one or more lines of video to filter the noise.

5. Add and scale the samples after filtering using a $\sin(x)/x$ function to reduce noise.

6. Add and scale the samples after filtering using finite impulse response filters.

DRE for global shutter sensors is functionally supported by simultaneously forming the base 12 bits in all rows during the main exposure. The dynamic range for each row of pixels is subsequently enriched on a line-by-line basis during readout; image formation hence switches to rolling shutter mode during sensor readout.

At the limiting condition where the main exposure and the DRE exposure are of equal duration, such as for example short exposure interval of one line time or less, the present invention is effectively a noise filter and the dynamic range enhancement minimizes 3 dB in the case of a single DRE exposure. Multiple DRE exposures again boost efficacy in this case, but with decreasing effectiveness.

Owing to a preference to not have floating point calculations and to preclude round-off errors, those skilled in the art will appreciate that it is preferable that the ratio of DRE integration time to the base integration by divisible by factor of 2 so that algorithmic multiplications can be handled by integer operations. This constraint also places the additional bits derived from the DRE exposure at proper integer positions. In setting the DRE integration time at $\frac{1}{256}^{th}$ ($\frac{1}{28}$), $\frac{1}{512}^{th}$ ($\frac{1}{29}$), or $\frac{1}{1024}^{th}$ ($\frac{1}{210}$), as examples, the composite dynamic range is thus more accurately assembled by the iSoC processing.

Those skilled in the art of video technology will also appreciate that the present invention enables smooth integration of in-sensor gamma functionality including programmable "knee" capability. Knee refers to a breakpoint in the video characteristic wherein the transfer curve transitions to an attenuated response profile (lower gain) to compress the information in a lossless or low-loss manner. For broadcast cameras, for example, the knee point is typically set at 100% signal and full saturation is either at 400% or 600%. While knee is usually performed in the camera via analog means to attenuate the signal over 100% to simulate film-like "shoulder" response, knee-like behavior is supported in the present invention by using the first exposure to digitize a first region of the video transfer characteristic; the DRE or second exposure then digitizes the post-knee region for brightly illuminated pixels. This allows the additional DRE bits to be scaled or losslessly compressed in a manner that is superior to in-camera implementations. Furthermore, the black data at the toe of the pixel transfer characteristic is more accurately digitized in the base exposure to enhance the smoothness of the information content in the black levels. The benefit is that high-performance CMOS sensors supporting very low-noise with exceptionally high charge-handling capacity, such that even when the available A/D converter resolution is inadequate, can be operated with full performance rather than being limited by objectionable quantization noise. Furthermore, the gamma function operates as lossless compression of the sensor dynamic range to allow physical reduction in the number of bits read out from the sensor while actually supporting higher dynamic range, i.e., 12 bits may be output by the sensor for actual 16 bit dynamic range.

Figure 8:
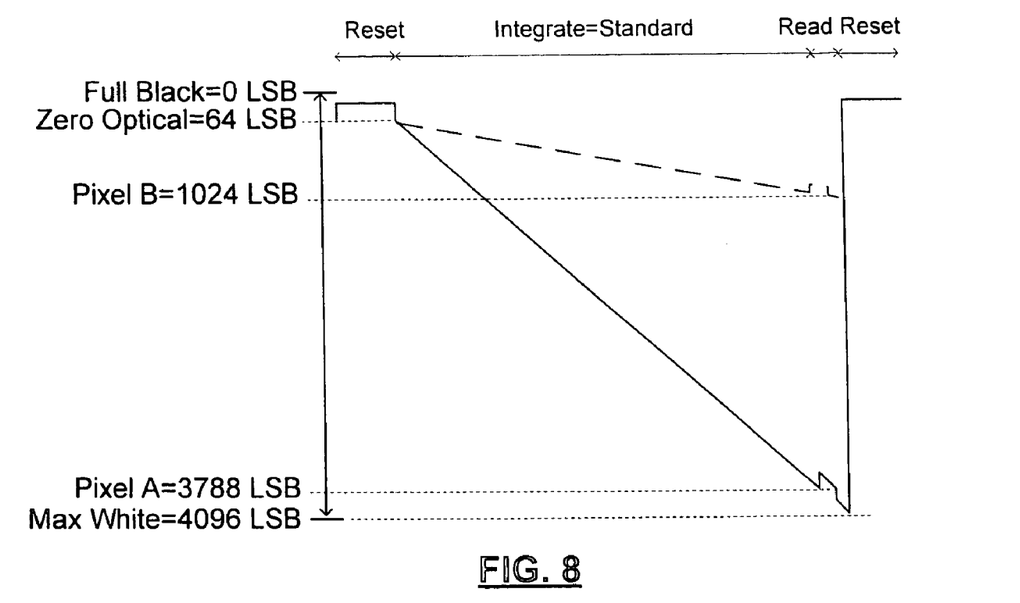
FIG. 8 is an illustration of the integration ramps for two representative pixels during primary exposure to generate the base imaging bits for 12 bit digitization where the A/D converter range is matched to the maximum pixel signal swing.
Figure 9:
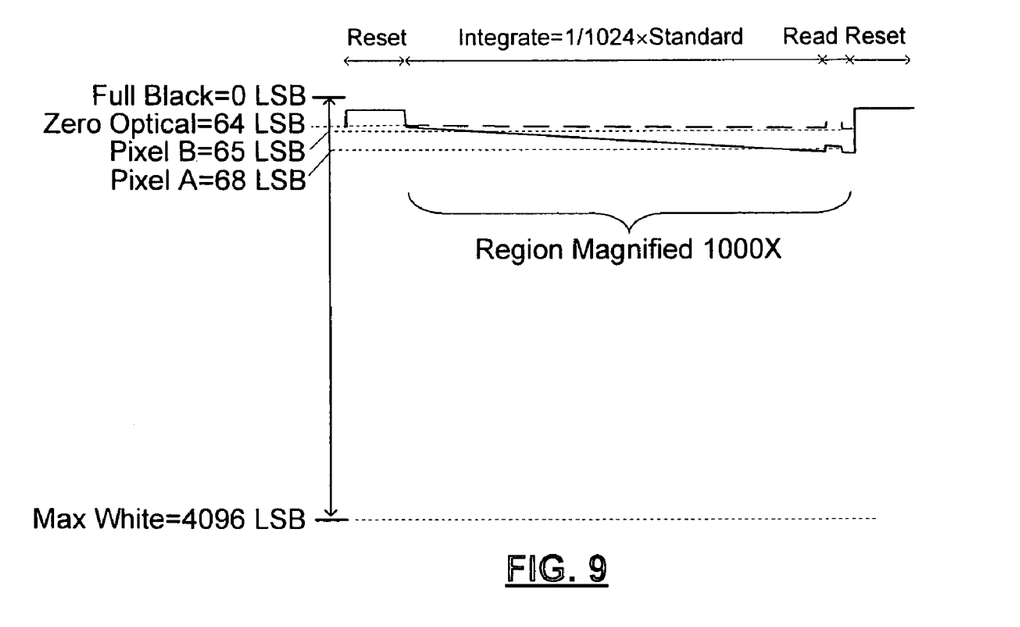
FIG. 9 is an illustration of the integration ramps for two representative pixels during a $2^{nd}$ short exposure ($1/1024^{th}$ of base exposure) to facilitate dynamic range enrichment where the A/D converter range is matched to the maximum pixel signal swing.

FIG. 8 shows the integration ramp for Pixel A and Pixel B at standard integration times. Once again, Pixel A's bright illumination results in a signal that is near the maximum 12-b ADC limit, at 3788 LSB. Pixel B's signal corresponds to a final value of 1024 LSB. Here the A/D converter is set up to nearly match the full pixel dynamic range. FIG. 9 shows the resulting integration ramps for a DRE exposure corresponding to $1/1024^{th}$ of the base exposure. Here the final values are 68 LSB and 65 LSB for Pixel A and Pixel B, respectively. Using the basic DRE algorithm, the final values for Pixel A and Pixel B are calculated:

Pixel $A = (3788-64)+1024\times(68-64) = 7818$

Pixel $B = (1024-64)+1024\times(65-64) = 1984$

Figure 10:
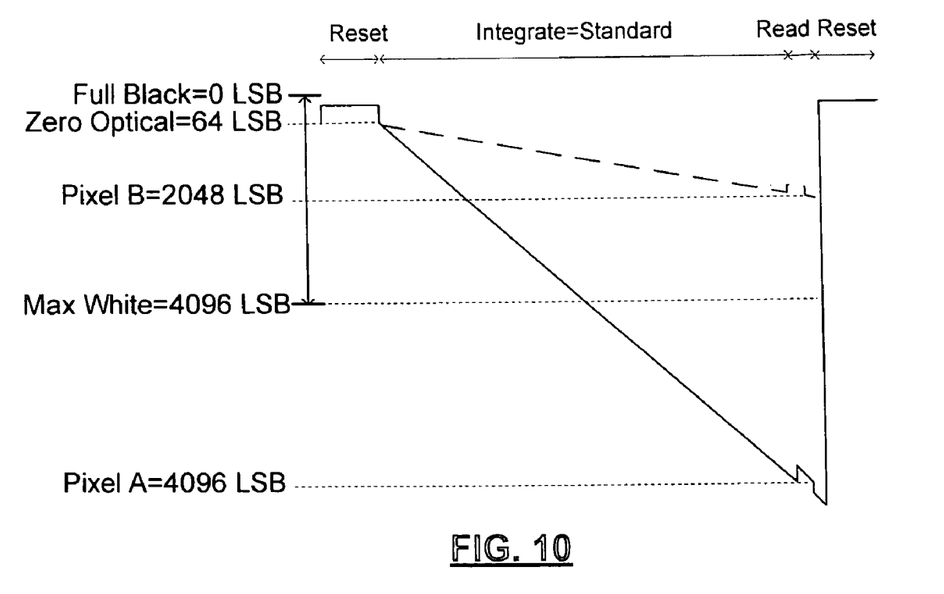
FIG. 10 is an illustration of the integration ramps for two representative pixels during primary exposure to generate the base imaging bits for 12 bit digitization where the A/D converter range is matched to half the maximum pixel signal swing.
Figure 11:
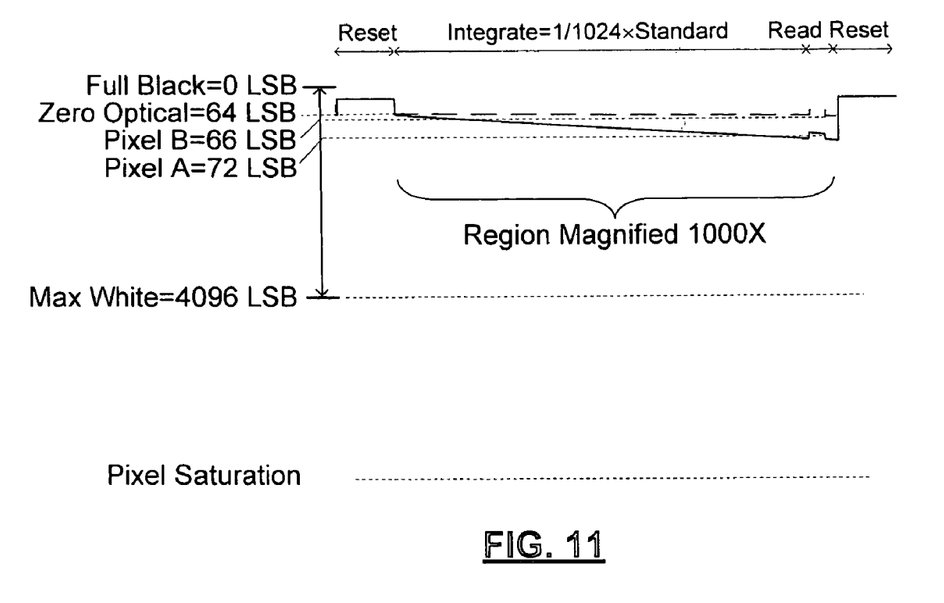
FIG. 11 is an illustration of the integration ramps for two representative pixels during a $2^{nd}$ short exposure ($1/1024^{th}$ of base exposure) to facilitate dynamic range enrichment where the A/D converter range is matched to half the maximum pixel signal swing.

In FIG. 10, the 12-bit ADC has been reconfigured to monitor one-half of the full pixel swing, consequently, the base exposure value for Pixel A is now 4096, because it is clipped at the maximum ADC limit. Pixel B, on the other hand, has a larger final value of 2048. FIG. 11 shows the resulting integration ramps for a DRE exposure corresponding to $1/1024^{th}$ of the base exposure. Here the final values for Pixel A and Pixel B are:

Pixel $A = (4096-64)+1024\times(72-64-4) = 8128$

Pixel $B = (2048-64)+1024\times(68-64-4) = 1984$ where an additional value of 4 is subtracted from the calculation for the DRE exposure to set a knee-point for applying a gamma operation. For this first example, however, there is no attenuation beyond the knee point. Note that the values for the DRE frame are more robust and less vulnerable to noise including ADC quantization error. If attenuation of 6 dB is now applied to the DRE data, the modified values for Pixel A and Pixel B become:

$$\text{Pixel} A = (4096 - 64) + 1024 \times (72 - 64 - 4) \times \frac{1}{2} = 6080$$

$$\text{Pixel} B = (2048 - 64) + 1024 \times (68 - 64 - 4) \times \frac{1}{2} = 1984$$

The linearly restatement of Pixel A's value from its prior value of 8128 to the modified level of 6080 is lossless compression. Since Pixel B's value is below the knee point, there is no compression here. The factor of ½ used in handling the DRE frame exposure corresponds to constant −6 dB attenuation to achieve 2 bit compression without losing any information. This factor is programmable in the present invention and can be replaced with alternative values via on-chip programming and/or a Look-Up Table (LUT) with nonlinear monotonic behavior.

Figure 12:
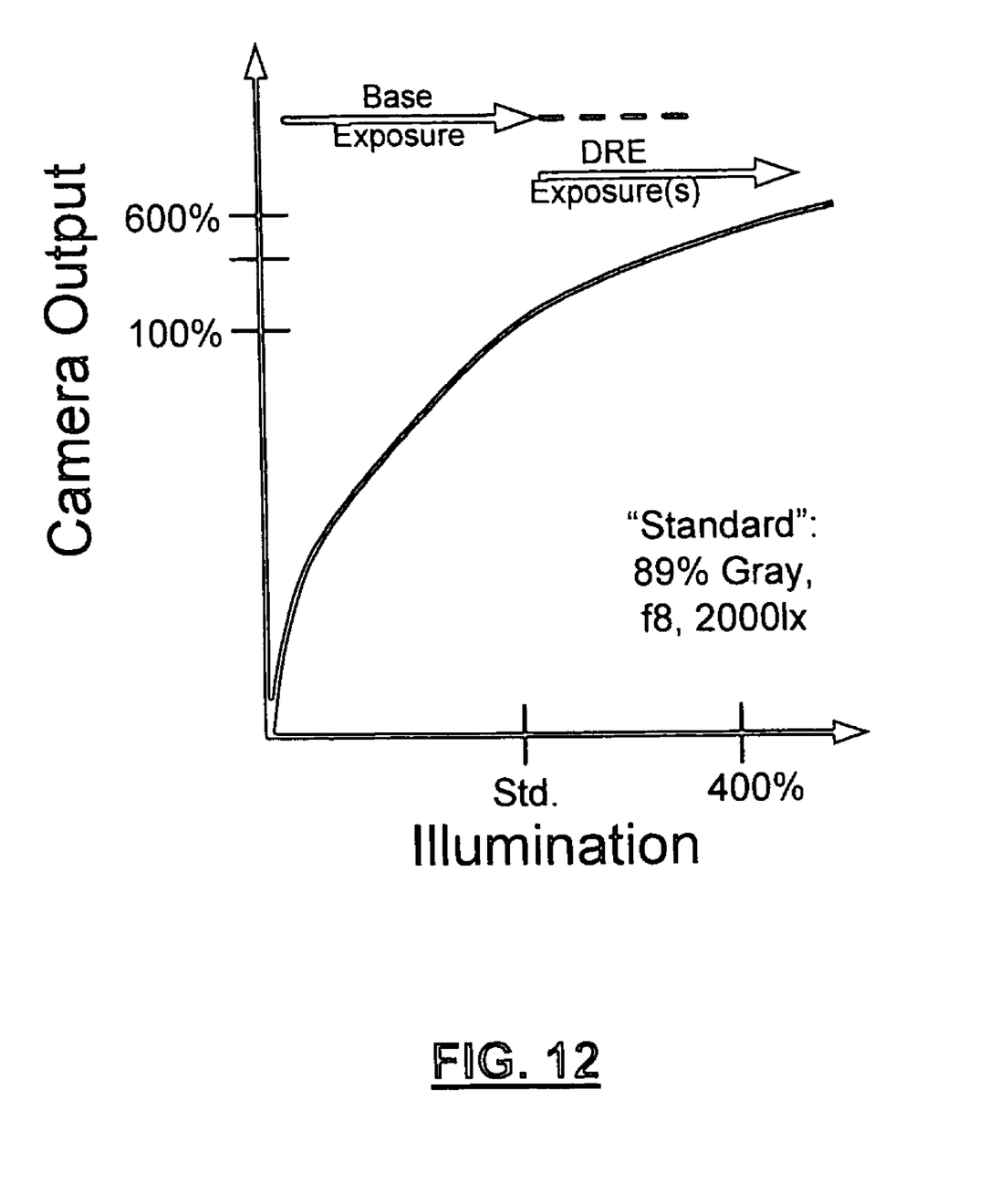
FIG. 12 is an illustration of a representative gamma characteristic wherein attenuation is applied to strong signals and amplification is applied at low level of light.

FIG. 12 shows a representation of a typical gamma curve that amplifies low-level signals and attenuates high-level signal information beyond 100%, where 100% is the signal value generated when viewing an 89% gray patch at 2000 lux illumination and f8 aperture. The necessary amplification of small signals to support gamma amplification with the highest possible fidelity is also supported by the present invention.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for enhancing the dynamic range of an electronic image sensor, the image sensor having rows of pixels, the method comprising:
   processing a pixel signal over a first integration period to form a first signal sample for each pixel in a current row;
   reading the first signal sample for each pixel in the current row, on a row-by row basis;
   storing the first signal samples from the current row of the imaging sensor in a memory;
   processing the pixel signal for each pixel in the current row over a second integration period, prior to reading the first signal samples of a next row, to form a second signal sample of each pixel in the current row; and
   combining the first and second signal sample for each pixel of the first row to produce an enhanced signal, thereby enhancing the dynamic range of the image sensor.

2. The method of claim 1, wherein the second period is shorter in duration than the first period.

3. The method of claim 2, wherein the second period is $1/1000^{th}$ of the first period, such that the second period effectively adds information at or above the $10^{th}$ significant bit.

4. The method of claim 1, wherein the memory is incorporated on the image sensor chip.

5. The method of claim 1, wherein the method is performed by modifying a standard readout timing signal to include two readout signals for each row of the image sensor.

6. The method of claim 5, wherein the steps of the method are transparent to other processing blocks in the image sensor.

7. The method of claim 1, further comprising processing three or more signal samples for each pixel.

8. The method of claim 1, wherein the first and second signal samples are combined external to the image sensor.

9. The method of claim 1, wherein the step of combining comprises scaling the first and second signal samples according to a ratio of the respective integration periods, and then adding the scaled samples.

10. The method of claim 1, wherein an analog-to-digital converter in a signal path of the image sensor is adjusted during the second period to more finely digitize a smaller portion of the pixel signal during the second period, and then adding the finely digitized signal sample to the first signal sample.

11. The method of claim 1, wherein the step of combining comprises scaling the second signal sample by a product of the ratio of the integration periods and a measured correction factor, and then adding the scaled signal to the first signal sample.

12. The method of claim 1, wherein the step of combining comprises scaling the second signal sample by a weighted ratio of the integration periods, and then adding the scaled signal to the first signal sample.

13. The method of claim 1, wherein the step of combining comprises filtering the signal samples using a sin(x)/x function, and then scaling and adding the samples.

14. The method of claim 1, wherein the step of combining comprises filtering the signal samples using a finite impulse response function, and then scaling and adding the samples.

15. The method of claim 1, wherein for operation with an image sensor utilizing a global shutter, the first signal sample is formed for each pixel in the sensor during a main exposure using a global shutter, and then each pixel in each row is enhanced by forming the second signal sample during signal readout of each row.

16. The method of claim 1, wherein for video processing, the first signal sample is processed during a period from a first region of a video transfer characteristic, and the second signal sample is processed from a post-knee region for brightly illuminated pixels.

17. An electronic image sensor comprising:
a plurality of pixels arranged in a plurality of rows;
a timing controller to control the readout of signals from each pixel on a row-by-row basis;
a dynamic range enhancement circuit that receives the signals read out from each row of pixels; and
a dynamic range enhancement memory circuit connected to the dynamic range enhancement circuit;
wherein the timing controller controls the read out of a first signal and a second signal from each pixel in a current row, the first and second signals read out before reading out signals from a next row;
wherein the dynamic range enhancement memory stores the first signal for each pixel in a row, while the second signal is being read out from the row; and
wherein the dynamic range enhancement circuit combines the first and second signals.

18. The image sensor of claim 17, wherein a duration of the second signal is shorter than a duration of the first signal.

19. The image sensor of claim 18, wherein the duration of the second signal is $1/1000^{th}$ of the first signal, such that the second signal effectively adds information at or above the $10^{th}$ significant bit.

20. The image sensor of claim 17, wherein the dynamic range enhancement circuit combines the first and second signals by scaling the first and second signals according to a ratio of the respective integration periods, and then adds the scaled signals.

21. The image sensor of claim 17, further comprising an analog-to-digital converter in a signal path of the image sensor, wherein the analog-to-digital converter is adjusted during readout of the second signal to more finely digitize a smaller portion of the second signal.

22. The image sensor of claim 17, wherein the dynamic range enhancement circuit combines the first and second signals by scaling the second signal by a product of the ratio of the integration periods and a measured correction factor, and then adds the scaled signal to the first signal.

23. The image sensor of claim 17, wherein the dynamic range enhancement circuit combines the first and second signals by scaling the second signal by a weighted ratio of the integration periods, and then adds the scaled signal to the first signal.

24. The image sensor of claim 17, wherein the dynamic range enhancement circuit combines the first and second signals by filtering the signals using a $\sin(x)/x$ function, and then scales and adds the signals.

25. The image sensor of claim 17, wherein the dynamic range enhancement circuit combines the first and second signals by filtering the signals using a finite impulse response function, and then scales and adds the signals.

26. The image sensor of claim 17, wherein for operation with an image sensor utilizing a global shutter, the first signal is formed for each pixel in the sensor during a main exposure using a global shutter, and then each pixel in each row is enhanced by forming the second signal during signal readout of each row.

27. The image sensor of claim 17, wherein for video processing, the first signal is processed during a period from a first region of a video transfer characteristic, and the second signal is processed from a post-knee region for brightly illuminated pixels.

* * * * *